United States Patent [19]

Haw et al.

[11] Patent Number: 4,750,490
[45] Date of Patent: Jun. 14, 1988

[54] METHOD FOR TAGGING FISH FOR IDENTIFICATION

[75] Inventors: Frank Haw; Peter K. Bergman, both of Olympia, Wash.

[73] Assignee: Northwest Marine Technology, Inc., Shaw Island, Wash.

[21] Appl. No.: 51,136

[22] Filed: May 18, 1987

[51] Int. Cl.⁴ .............................................. A61B 17/00
[52] U.S. Cl. ........................................ 128/330; 119/3; 40/300
[58] Field of Search .................. 128/330, 316; 604/62; 119/3; 40/300

[56] References Cited

U.S. PATENT DOCUMENTS

| | | |
|---|---|---|
| 3,128,744 | 4/1964 | Jefferts et al. |
| 3,313,301 | 4/1967 | Jefferts et al. |
| 3,545,405 | 12/1970 | Jefferts et al. |
| 3,820,545 | 6/1974 | Jefferts ........................................ 119/3 |
| 4,233,964 | 11/1980 | Jefferts et al. .......................... 128/330 |
| 4,437,361 | 3/1984 | Steckel et al. .......................... 128/316 |

OTHER PUBLICATIONS

B. R. Heugel et al., "Subcutaneous Diazo Film Tag for Small Fishes," The Progressive Fish-Culturist, vol. 39, No. 2, Apr. 1977.

Primary Examiner—C. Fred Rosenbaum
Assistant Examiner—Frank Wilkens
Attorney, Agent, or Firm—Kenyon & Kenyon

[57] ABSTRACT

In the identification of fish, tags having on at least one side visually detectable markings encoding information pertaining to a fish are shallowly implanted within transparent or semi-transparent tissues of respective specimens. Upon release and subsequent capture of the fish specimens, the locations of the tags are optically determined by a visual inspection of the fish. The information is retrieved from the tags by either reading the information from the implanted tags through the transparent or semi-transparent tissue or excising the tags and thereupon reading the information. In either case, the specimens are not significantly harmed or injured by virtue of the implantation and reading operations. The implanted tags also have a minimum effect on survival and other biological traits and behavior.

29 Claims, 1 Drawing Sheet

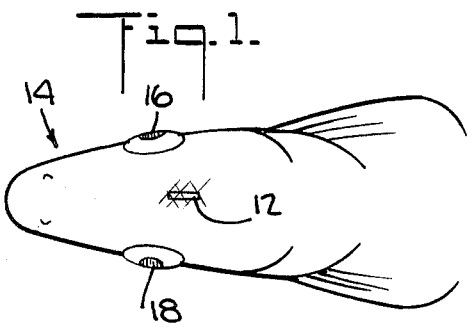
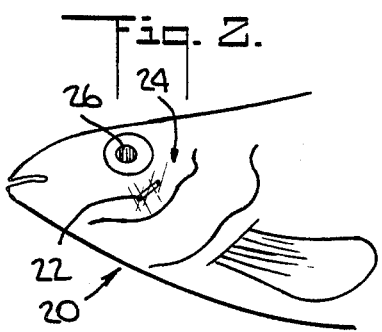
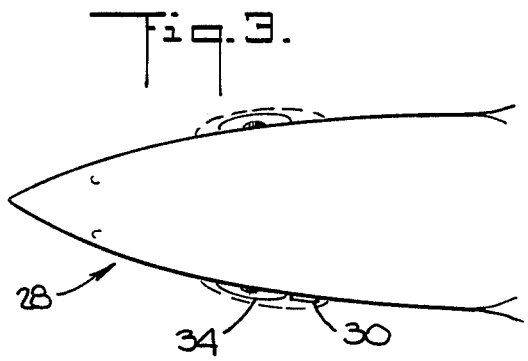
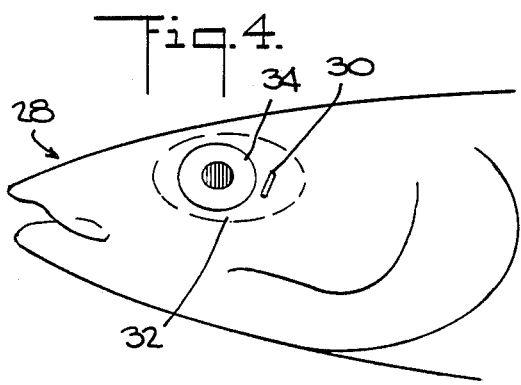
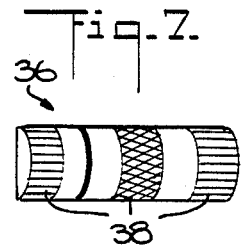
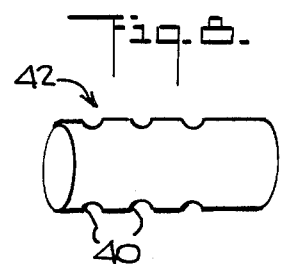
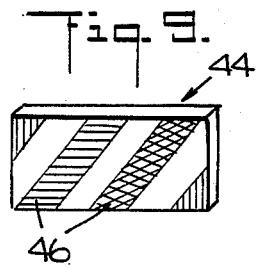
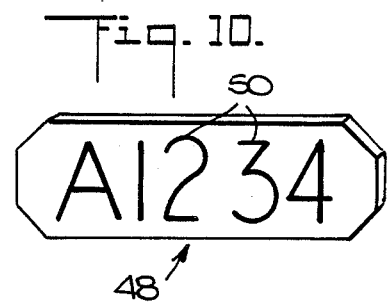
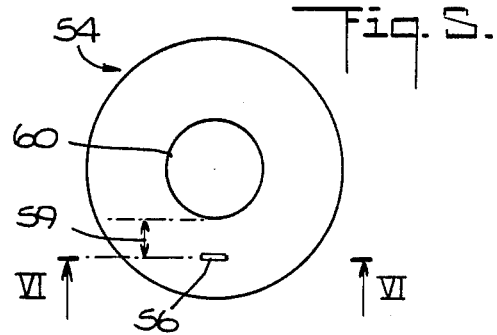
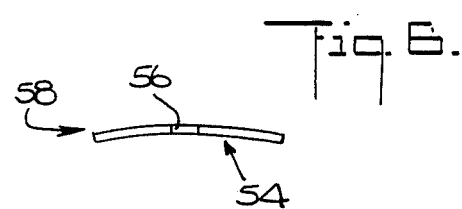

METHOD FOR TAGGING FISH FOR IDENTIFICATION

BACKGROUND OF THE INVENTION

This invention relates to a method for tagging a fish for identification purposes and, more generally, relates to a method of identifying fish.

As described in U.S. Pat. Nos. 3,128,744 and 3,545,405, small identifying tags implantable within the body tissues of macro-organisms such as fish are used for investigating the migratory habits of those organisms. Upon implantation of an identifying tag with coded information thereon, the organism is released to exist in its normal environment and is subsequently recovered along with a mass of organisms when they are removed from their normal environment. The tag is then excised from the organism's body tissues and the identifying data is deciphered and used for establishing research statistics. The statistics measure such parameters as population size, the rate of exploitation by commercial fisheries, the natural, i.e., non-fishery, mortality rate, migration routes, geographical limits to populations and genetic separation (as at spawning).

In the case that the identifying tag is completely contained within the body tissues of the organism, the tag can be retreived and read only by severely wounding or killing the host organism.

As described in U.S. Patent Application Ser. No. 740,193, filed May 31, 1985, an identifying tag may take such a form that the identifying information is carried on a portion of the tag outside the body tissues of the host organism. Although in the case of such an externally readable tag the host organism need not be sacrificed in order to retreive the identifying information, the externally visible tag has the disadvantage of possibly significantly modifying survival and other biological traits and behavior. In addition, percutaneous tags are frequently shed or otherwise lost.

In the case of completely internal identifying tags in the form of cylindrical stainless steel segments, implantation of the tags into respective organisms is implemented by first severing the segments sequentially from a continuous strand of wire and injecting them one by one into the respective organisms, as disclosed in U.S. Pat. No. 3,820,545 and U.S. patent application Ser. No. 916,165 filed Oct. 7, 1986. In accordance with the disclosures of those two documents and pursuant to universal practice in the fisheries industry, internal tags are implanted at locations deep within the body tissues of the host organisms and are visible, without manipulating the body tissues, only in extraordinary circumstances.

U.S. Pat. No. 3,313,301 is another patent directed to an instrument for implanting an identifying tag in a macro-organism such as a fish, while U.S. Pat. No. 4,233,964 discloses an identifying tag having a plurality of spaced grooves and apertures defining a code readable by x-ray equipment.

OBJECTS OF THE INVENTION

An object of the present invention is to provide an improved method for identifying macro-organisms such as fish by tagging techniques.

Another object of the present invention is to provide such a method wherein fish are identified by means of tags implanted completely within body tissues of the fish.

Another, more particular, object of the present invention is to provide such a method in which the locations of the tags within the fish are determinable by a visual or optical inspection of the fish.

Another, even more particular, object of the present invention is to provide such a method wherein information on implanted tags can be read visually optically while the tags are still disposed within the body tissues of the host fish.

A further very particular, and alternative, object of the present invention is to provide such a method wherein the implanted tags may be easily excised and read without significantly harming the living specimens.

SUMMARY OF THE INVENTION

The invention is directed to a method for tagging a fish for identification, wherein the fish has a naturally occcuring region of at least partially transparent tissue and an outer surface bounding that region. The method comprises the steps of providing a tag having detectable markings forming an identification code and implanting the tag shallowly within the region of at least partially transparent tissue, proximately to the outer boundary surface, so that the tag is substantially completely embedded in the transparent tissue and is visible through the tissue and the boundary surface. Accordingly, it is contemplated that the entire tag is embedded in body tissues of the host fish and preferably completely within transparent tissue. However, it may be possible in some cases that a small portion of the tag will be embedded in opaque tissues contiguous with the transparent tissue.

Pursuant to one embodiment of the present invention, the method further comprises the steps of releasing the tagged fish into a body of water, subsequently capturing the fish and optically reading the detectable markings through the transparent or semi-transparent tissue and the boundary surface to determine information included in the identification code. Pursuant to another, alternative, embodiment of the present invention, the method further comprises the steps of (a) releasing the tagged fish into a body of water, (b) subsequently capturing the fish, (c) optically detecting the tag through the transparent or semi-transparent tissue and the boundary surface, (e) removing the tag from the fish in such a manner as to avoid impairing life functions of the fish and (e) reading the detectable markings upon removal of the tag from the fish to determine information included in the identification code.

The internal visible coded tag is made of a biologically compatible alloy or synthetic (e.g., a polyester). The tag is sufficiently small to be injected by a hypodermic needle or implanted by other suitable means in a region of transparent or semi-transparent tissue. Preferably, the identifying tags are shaped to facilitate shallow implantation, retention and visibility. Both cylindrical and flattened tags of metallic alloys and plastics have been successfully implanted in small coho salmon and other fishes. Generally, a flattened configuration is most preferred with respect to both permanent retention and high visibility.

The detectable markings on an identifying tag used in a method pursuant to the present invention may comprise visually detectable indentations such as notches and grooves coding binary words. Alpha numeric codes may be used. Codes utilizing bars and other shapes of visually differentiable colors should be employed. Color-coded information, however, would preferably take into account the importance of cryptic coloration in animals.

Pursuant to a particular feature of the present invention, the optical reading of the detectable markings could be implemented manually by the naked eye, manually through the aid of a magnification instrument or mechanically. In accordance with another feature of the present invention especially applicable to the embodiment wherein the identification tag is removed from the transparent or semitransparent tissue, an additional tag having detectable markings forming an identification code may be implanted shallowly within another naturally occurring region of at least partially transparent tissue in the specimen fish proximately to an outer surface bounding that other region, so that the additional tag is substantially completely embedded in the tissue of the other region and is visible through that tissue and through the respective outer boundary surface. In many circumstances, the additional tag is advantageously implanted subsequent to the excision of the first tag from the specimen.

In a method in accordance with the present invention, fish are tagged with information-bearing internal tags which are subsequently read either externally through transparent or semi-transparent tissue or excised and read. In either case, the reading occurs without significantly harming the living tagged specimen. In addition, the tagging is implemented without significantly modifying survival and other biological traits and behavior.

BRIEF DESCRIPTION OF THE DRAWINGS

The invention will now be described in detail, reference being made to the accompanying drawings which show exemplary applications of a method pursuant to the present invention.

FIG. 1 is a schematic dorsal view of the head of a sunfish, showing a location for an internal, visually detectable and coded tag between the skull and the dermis of the fish.

FIG. 2 is a schematic side view of the head of a darter, showing a location for an internal, visually detectable and coded tag in transparent or semi-transparent tissue positioned beneath a preopercle of the fish.

FIG. 3 is a schematic dorsal view of the head of a mackerel, showing a location for an internal, visually detectable identification tag covered by adipose eyelid tissue of the fish.

FIG. 4 is a schematic side view of the fish head shown in FIG. 3, also illustrating the location of an internal visually detectable tag covered by adipose eyelid tissue.

FIG. 5 is a side elevational view of an eye of a tuna or billfish, showing a location for an internal, visually detectable identification tag in the cornea of the fish, in accordance with the present invention.

FIG. 6 is a partial cross-sectional view taken along line VI—VI in FIG. 5.

FIGS. 7-10 are side elevational views of different types of coded identification tags usable in a method pursuant to the present invention.

DETAILED DESCRIPTION

This invention is directed to a method for identifying a fish and, more particularly, to a method for tagging a fish for identification. The method pertains to fish having a naturally occurring region of at least partially transparent tissue and an outer surface bounding that region. The region of tissue may be transparent or semi-transparent throughout or may have a varying degree of transparency.

In tagging a fish for identification pursuant to the present invention, a tag (see FIGS. 7-10) having detectable markings forming an identification code is implanted shallowly within the region of at least partially transparent tissue, proximately to the other boundary surface, so that the tag is substantially completely embedded in the tissue and is visible through the tissue and the boundary surface. Because of the visibility of the tag, its location may be determined by a simple visual inspection of the tagged specimen.

Generally, upon implantation of the tag into the region of transparent or semi-transparent tissue, the fish is released into a lake or ocean or other body of water and is subsequently captured after a more or less lengthy period of time. Pursuant to a preferred embodiment of the invention, the information coded on the tag is retrieved by optically reading the detectable markings through the transparent or semi-transparent tissue and the boundary surface. The tag remains embedded in the fish tissue and the specimen remains alive and healthy. Advantageously, the information-encoding markings are readable with the naked eye. However, it is within the scope of the present invention that the markings be read optically with the aid of a magnification instrument or mechanically.

In accordance with another preferred, but alternative, embodiment of the present invention, the information encoded in the detectable markings on the tag is recovered by removing the tag from the region of transparent or semi-transparent tissue in such a manner as to avoid impairing the life functions of the host fish. The markings are then mechanically or optically read, with or without the aid of a magnification instrument, to determine the information identifying the host fish. In addition, the same fish may be tagged again in the same manner, i.e., by the shallow implantation of a visually detectable tag having readable markings, and released into a natural or man-made body of water. Upon subsequent recapture of the specimen, the second tag may be read to determine the further identifying information pertaining to the specimen.

The step of implanting the identification tag may be implemented with a hypodermic needle or other specialized device, whereby the tag is injected into the transparent or semi-transparent tissue, as generally described in U.S. Pat. Nos. 3,820,545 or 3,313,301. Both of those patents in their entireties are hereby corporated by reference herein.

As illustrated in FIG. 1, a tag 12 having on at least one side visually detectable markings is shallowly implanted on the dorsal side of the head 14 of a sunfish (Centrachidae) between the skull and an outer boundary surface or dermis and substantially between the eyes 16 and 18 of the fish.

FIG. 2 depicts, in side elevational view, the head 20 of a darter or perch (Percidae). An identification tag 22 having on at least one side visually detectable markings encoding information pertaining to the fish has been injected into a region of substantially transparent tissue located beneath the skin of the preopercle region 24 of the fish. Reference numeral 26 represents the eye of the fish.

FIGS. 3 and 4 show dorsal and side elevational views of the head 28 of a mackerel (Scomber). An identification tag 30 is shallowly implanted in a region 32 of adipose eyelid tissue to the rear of the eye 34 of the fish. The adipose eyelid tissue is transparent and enables an observer to detect the presence of, and the markings on, the identification tag 30.

FIGS. 5 and 6 are a side elevational and a partial cross-sectional view of the eye 54 of a tuna or billfish (Istiophoridae) (not illustrated), showing an optically detectable tag 56 embedded in corneal tissue 58 of the eye. The tag is advantageously provided with visually readable markings, as described in detail hereinafter with reference to FIGS. 7-10, so that identification information on the tag may be visually or optically read through the corneal tissue 58 and through the boundary surface thereof, without excising the tag from the fish. As depicted in FIG. 5, the tag 56 is disposed at a sufficient distance 59 from the pupil 60 to avoid any impairment to the functioning of the eye.

As illustrated in FIG. 7, an identification tag used in a method pursuant to the present invention may take the form of a cylinder or semi-cylinder 36 provided on at least one side with a plurality of differently colored or differently hatched circumferentially extending areas 38 which encode information pertaining to the specimen to be tagged. The inforamtion may also be encoded in the form of notches or grooves 40 in the surface of a tag 42 (FIG. 8).

An advantageous tag 44 for purposes of the present invention is the flattened configuration illustrated in FIGS. 9 and 10. Tag 44 exemplarily carries a plurality of color or bar codes 46 for identifying a tagged specimen. Tag 48 is a modified flattened configuration and carries an alphanumeric designation 50.

A tag used in a method in accordance with the invention is made of biologically compatible alloy material or of synthetic resin such as polyester.

When the fish to be tagged is a sunfish, the tag can be advantageously located between the dermis and the skull on the dorsal side of the fish, as shown in FIG. 1. When the fish to be tagged is a darter, the tag can be advantageously located beneath the preopercle, as shown in FIG. 2. When the fish is a member of the Salmonidae, a mackerel (Scombridae), or a member of the Carangidae, the tag is advantageously implanted in adipose eyelid tissue (see FIGS. 3 and 4). In the case of a tuna or billfish or other fishes having a suitably thick cornea, the tag may be implanted in the corneal tissues of the eye (FIGS. 5 and 6).

Although the invention has been described in terms of particular embodiments and modifications, one of ordinary skill in the art, in light of this teaching, can generate additional embodiments and modifications without departing from the spirit of or exceeding the scope of the claimed invention. For example, many fishes other than those presented as examples herein have transparent or semi-transparent tissue suitable for receiving a tag in accordance with the method set forth. Accordingly, it is to be understood that the drawings and descriptions herein are proffered by way of example to facilitate comprehension of the invention and should not be construed to limit the scope thereof.

What is claimed is:

1. A method for tagging a fish for identification, said fish having a naturally occurring region of at least partially transparent tissue and an outer surface bounding said region, said method comprising the steps of:

providing a tag having detectable markings forming an identification code; and implanting said tag shallowly within said region of at least partially transparent tissue, proximately to said outer surface bounding said region, so that said tag is substantially completely embedded in said tissue and is visible through said tissue and said surface.

2. The method defined in claim 1, further comprising the steps of:

releasing said fish into a body of water;

subsequently capturing said fish; and optically reading said detectable markings through said tissue and said surface to determine information included in said identification code.

3. The method defined in claim 1, further comprising the steps of:

releasing said fish into a body of water;

subsequently capturing said fish;

optically detecting said tag through said tissue and said surface;

removing said tag from said region in such a manner as to avoid impairing life functions of said fish; and reading said detectable markings upon removal of said tag from said fish to determine information included in said identification code.

4. The method defined in claim 1 wherein said step of implanting comprises the step of injecting said tag with a hypodermic needle or other specialized device into said tissue.

5. The method defined in claim 1 wherein said tag is made of biologically compatible alloy material.

6. The method defined in claim 1 wherein said tag is made of biologically compatible synthetic resin material.

7. The method defined in claim 1 wherein said tag is flattened.

8. The method defined in claim 1 wherein said detectable markings comprise binary words.

9. The method defined in claim 1 wherein said detectable markings comprise bars of visually differentiable colors.

10. The method defined in claim 1 wherein said detectable markings comprise visually detectable indentations in said tag.

11. The method defined in claim 1 wherein said detectable markings comprise visually detectable alphanumerics.

12. The method defined in claim 1 wherein said fish has a dermis and a skull, said region being located between said dermis and said skull.

13. The method defined in claim 12 wherein said fish is a sunfish (Centrarchidae).

14. The method defined in claim 1 wherein said fish has a preopercle and said region is juxtaposed to said preopercle.

15. The method defined in claim 14 wherein said fish is a darter or perch (Percidae).

16. The method defined in claim 1 wherein said fish has adipose eyelid tissue, said adipose eyelid tissue constituting said at least partially transparent tissue.

17. The method defined in claim 16 wherein said fish is a member of the Salmonidae.

18. The method defined in claim 16 wherein said fish is a mackerel.

19. The method defined in claim 1 wherein said at least partially transparent tissue constitutes corneal tissue.

20. The method defined in claim 19 wherein said fish is a tuna or billfish (Istiophoridae).

21. The method defined in claim 1 wherein said fish is a member of Carangidae.

22. A method for identifying a fish, said fish having a naturally occurring region of at least partially transparent tissue and an outer surface bounding said region, said method comprising the steps of:
providing a tag having detectable markings forming an identification code;
implanting said tag shallowly within said region of at least partially transparent tissue, proximately to said outer surface bounding said region, so that said tag is substantially completely embedded in said tissue and is visible through said tissue and said surface;
releasing said fish into a body of water;
subsequently capturing said fish;
optically detecting said tag through said tissue and said surface;
removing said tag from said fish in such a manner as to avoid impairing life functions of said fish; and
reading said detectable markings upon removal of said tag from said fish to determine information included in said identification code.

23. The method defined in claim 22, further comprising the steps of:
providing an additional tag having visually detectable markings forming an identification code; and
implanting said additional tag shallowly within another region of at least partially transparent tissue in said fish, proximately to an outer surface bounding said other region, so that said additional tag is substantially completely embedded in the tissue of said other region and is visible through the tissue of said other region and through the outer surface bounding said other region.

24. A method for tagging a fish for identification, said fish having a naturally occurring region of at least partially transparent tissue and an outer surface bounding said region, said method comprising the steps of:
providing a tag having on one side thereof visually detectable markings forming an identification code; and
implanting said tag shallowly within said region of at least partially transparent tissue, proximately to said outer surface bounding region, so that said tag is substantially completely embedded in said tissue and so that said visually detectable markings face said surface so as to be visible through said tissue and said surface.

25. A method for identifying a fish, said fish having a naturally occurring region of at least partially transparent tissue and an outer surface bounding said region, said method comprising the steps of:
providing a tag having on one side thereof visually detectable markings forming an identification code;
implanting said tag shallowly within said region of at least partially transparent tissue, proximately to said outer surface bounding said region, so that said tag is substantially completely embedded in said tissue and so that said visually detectable markings face said surface so as to be visible through said tissue and said surface;
releasing said fish into a body of water;
subsequently capturing said fish; and
optically reading said visually detectable markings through said tissue and said surface to determine information included in said identification code.

26. The method defined in claim 25 wherein said step of optically reading is implemented mechanically.

27. The method defined in claim 25 wherein said step of optically reading comprises the step of visually reading said visually detectable markings.

28. The method defined in claim 27 wherein said step of visually reading is accomplished with the aid of optical magnification means.

29. The method for identifying a fish, said fish having a naturally occurring region of at least partially transparent tissue and an outer surface bounding said region, said method comprising the steps of:
providing a tag having on one side thereof visually detectable markings forming an identification code;
implanting said tag shallowly within said region of at least partially transparent tissue, proximately to said outer surface bounding said region, so that said tag is substantially completely embedded in said tissue and so that said visually detectable markings face said surface so as to be visible through said tissue and said surface;
releasing said fish into a body of water;
subsequently capturing said fish; and
optically reading said visually detectable markings through said tissue and said surface without removing said tag from said tissue.

* * * * *